United States Patent
Hsueh

(10) Patent No.: US 8,730,437 B2
(45) Date of Patent: May 20, 2014

(54) METHOD FOR MAKING A TREATED POLYMER FOR A LIQUID CRYSTAL ALIGNMENT AGENT, THE TREATED POLYMER MADE THEREBY, AND LIQUID CRYSTAL ALIGNMENT AGENT, LIQUID CRYSTAL ALIGNMENT FILM AND LIQUID CRYSTAL DISPLAY ELEMENT CONTAINING THE TREATED POLYMER

(75) Inventor: Huai-Pin Hsueh, Tainan (TW)

(73) Assignee: Chi Mei Corporation, Tainan (TW)

( * ) Notice: Subject to any disclaimer, the term of this patent is extended or adjusted under 35 U.S.C. 154(b) by 630 days.

(21) Appl. No.: 12/964,645

(22) Filed: Dec. 9, 2010

(65) Prior Publication Data

US 2011/0255042 A1 Oct. 20, 2011

(30) Foreign Application Priority Data

Apr. 14, 2010 (TW) .............................. 99111602 A

(51) Int. Cl.
*G02F 1/1337* (2006.01)
*C08G 63/90* (2006.01)

(52) U.S. Cl.
USPC .......................................... 349/124; 528/288

(58) Field of Classification Search
USPC ............................. 349/124; 528/288; 428/1.1
See application file for complete search history.

(56) References Cited

U.S. PATENT DOCUMENTS

| 2004/0031950 | A1 | 2/2004 | Shimizu et al. | |
|---|---|---|---|---|
| 2009/0280236 | A1* | 11/2009 | Hsueh | 427/58 |
| 2011/0313126 | A1 | 12/2011 | Hsueh | |
| 2012/0101224 | A1 | 4/2012 | Tsai | |
| 2012/0162588 | A1 | 6/2012 | Tsai | |

FOREIGN PATENT DOCUMENTS

| JP | 2-282726 A | 11/1990 |
|---|---|---|
| JP | 3-179323 A | 8/1991 |
| JP | 7-043725 A | 2/1995 |
| JP | 7-110484 A | 4/1995 |
| JP | 7-234410 A | 9/1995 |
| JP | 10-333153 A | 12/1998 |
| JP | 11-193345 A | 7/1999 |
| JP | 2002-162630 A | 6/2002 |
| JP | 2003-096034 A | 4/2003 |
| JP | 2006-023344 A | 1/2006 |
| JP | 2006-028098 A | 2/2006 |
| TW | 200613522 | 5/2006 |
| TW | 201007304 | 2/2010 |
| WO | WO-00/61684 A1 | 10/2000 |
| WO | WO-2007/078153 A1 | 7/2007 |

OTHER PUBLICATIONS

U.S. Appl. No. 13/572,350, filed Aug. 10, 2012, by Tsai, Tsung-Pei.
"Office Action of Taiwan Counterpart Application", issued on May 30, 2013, p. 1-p. 5, in which the listed references were cited.

* cited by examiner

*Primary Examiner* — Ling Choi
*Assistant Examiner* — Catherine S Branch
(74) *Attorney, Agent, or Firm* — Jianq Chyun IP Office

(57) ABSTRACT

A method for making a treated polymer for a liquid crystal alignment agent includes the steps of: subjecting a tetracarboxylic dianhydride compound and a diamine compound to conduct a polymerization reaction to obtain an untreated polymer; preparing a co-precipitating solvent for the untreated polymer which includes a major amount of a poor solvent and a minor amount of a good solvent; and subjecting the untreated polymer to a treatment with the co-precipitating solvent such that at least a significant amount of a polymer fraction having a molecular weight not larger than 3,000 is removed from the untreated polymer to obtain the treated polymer. A treated polymer for a liquid crystal alignment agent, a liquid crystal alignment agent including the treated polymer, a liquid crystal alignment film formed of the liquid crystal alignment agent, and a liquid crystal display element including the liquid crystal alignment film are also disclosed.

18 Claims, No Drawings

METHOD FOR MAKING A TREATED POLYMER FOR A LIQUID CRYSTAL ALIGNMENT AGENT, THE TREATED POLYMER MADE THEREBY, AND LIQUID CRYSTAL ALIGNMENT AGENT, LIQUID CRYSTAL ALIGNMENT FILM AND LIQUID CRYSTAL DISPLAY ELEMENT CONTAINING THE TREATED POLYMER

CROSS-REFERENCE TO RELATED APPLICATION

This application claims priority of Taiwanese Application No. 099111602, filed on Apr. 14, 2010.

BACKGROUND OF THE INVENTION

1. Field of the Invention

This invention relates to a method for making a treated polymer, more particularly to a method for making a treated polymer for a liquid crystal alignment agent. The invention also relates to a liquid crystal alignment agent containing the treated polymer, a liquid crystal alignment film formed from the liquid crystal alignment agent, and a liquid crystal display element including the liquid crystal alignment film.

2. Description of the Related Art

A liquid crystal display element is widely used in a screen of a computer, a viewfinder of a camera, a projection display, a television screen, or the like.

Nematic liquid crystal display elements are predominantly used in general liquid crystal display elements, and concrete examples of the nematic liquid crystal display elements actually used include: (1) a TN (Twisted Nematic) liquid crystal display element, in which a liquid crystal alignment direction of one side substrate is twisted at a 90 degrees angle relative to a liquid crystal alignment direction of the other side substrate; (2) a STN (Super Twisted Nematic) liquid crystal display element, in which a liquid crystal alignment direction of one side substrate is twisted at an angle greater than 180 degrees relative to a liquid crystal alignment direction of the other side substrate; and (3) a TFT (Thin Film Transistor) liquid crystal display element which uses a thin film transistor.

It has been continuously attempted in the art to improve a liquid crystal alignment film in order to enhance the display performance of the liquid crystal display elements, for example, to reduce the image sticking problem.

The liquid crystal alignment film is made of a liquid crystal alignment agent. Conventionally, the liquid crystal alignment agent is formulated by dissolving polyamic acid or soluble polyimide in an organic solvent, and is then applied and cured on a substrate to form the liquid crystal alignment film.

The image sticking problem results from the residual direct current (DC) voltage. Specifically, when the residual DC voltage is large, it will remain even after the electric field has been turned off after being once turned on. In such a case, images to be erased will remain as image sticking. Therefore, it is desired that the residual DC voltage approach zero infinitesimally. This image sticking phenomenon is one of the most important issues in liquid crystal display elements.

JP 11-193345 discloses a polyimide resin made of two or more polyamic acids having different properties for preparation of a liquid crystal alignment film.

WO 0061684 discloses a varnish composition comprising a polymer component comprising a polyamide acid having a specifically defined structure, a polyamide having a specifically defined structure, or the polyamide and a soluble polyimide having a specifically defined structure.

WO 2007078153 discloses a composition for liquid crystal alignment comprising an oligoimide or oligoamic acid, which includes a thermocurable or photocurable functional group on at least one end of the oligoimide or oligoamic acid backbone. It is described that in the optical resolution process, polyimide used for liquid crystal alignment is selectively photo-decomposed and inevitably leads to generate decomposed by-products in small units. Such decomposed by-products can cause very serious problems in alignment stability and long-term reliability, particularly image sticking.

US 2004/0031950 discloses a liquid crystal alignment agent. It is briefly described to use a poor solvent to purify a polyamic acid used for preparing the liquid crystal alignment agent.

It is still required in the art to develop a liquid crystal alignment agent which can effectively shorten an image sticking erasing time.

SUMMARY OF THE INVENTION

Therefore, an object of the present invention is to provide a liquid crystal alignment agent which can effectively shorten an image sticking erasing time.

According to the first aspect of this invention, there is provided a method for making a treated polymer for a liquid crystal alignment agent, which includes the steps of: subjecting a tetracarboxylic dianhydride compound and a diamine compound to conduct a polymerization reaction to obtain an untreated polymer; preparing a co-precipitating solvent for the untreated polymer which includes a major amount of a poor solvent and a minor amount of a good solvent, the poor solvent being selected from the group consisting of a ketone, an ether, and a combination thereof; and subjecting the untreated polymer to a treatment with the co-precipitating solvent such that at least a significant amount of a polymer fraction having a molecular weight not larger than 3,000 is removed from the untreated polymer to obtain the treated polymer.

According to the second aspect of this invention, there is provided a treated polymer for a liquid crystal alignment agent made by a process comprising the steps of: subjecting a tetracarboxylic dianhydride compound and a diamine compound to conduct a polymerization reaction to obtain an untreated polymer; preparing a co-precipitating solvent for the untreated polymer which includes a major amount of a poor solvent and a minor amount of a good solvent, the poor solvent being selected from the group consisting of a ketone, an ether, and a combination thereof; and subjecting the untreated polymer to a treatment with the co-precipitating solvent such that at least a significant amount of a polymer fraction having a molecular weight not larger than 3,000 is removed from the untreated polymer to obtain the treated polymer.

According to the third aspect of this invention, there is provided a liquid crystal alignment agent which includes:

a treated polymer made by a process comprising the steps of: subjecting a tetracarboxylic dianhydride compound and a diamine compound to conduct a polymerization reaction to obtain an untreated polymer; preparing a co-precipitating solvent for the untreated polymer which includes a major amount of a poor solvent and a minor amount of a good solvent, the poor solvent being selected from the group consisting of a ketone, an ether, and a combination thereof; and subjecting the untreated polymer to a treatment with the co-precipitating solvent such that at least a significant amount of a polymer fraction having a molecular weight not larger than 3,000 is removed from the untreated polymer to obtain the treated polymer; and an organic solvent for dissolving the polymer.

According to the fourth aspect of this invention, there is provided a liquid crystal alignment agent, which includes a polymer obtained by subjecting a tetracarboxylic dianhydride compound and a diamine compound to conduct a polymerization reaction, and an organic solvent for dissolving the polymer. The liquid crystal alignment agent has a value (T) ranging from 0 to 1.0%, which is determined by: mixing the liquid crystal alignment agent with methanol in a weight ratio of 1:6 to obtain a first mixture containing a first solid precipitate; filtering the first solid precipitate out of the first mixture using a filter of 0.2 μm; drying the first solid precipitate in an oven at a temperature of 60° C. for 12 hours to obtain a dried solid having a weight value ($W_s$); mixing the dried solid with N-methyl-2-pyrrolidone in a weight ratio of 1:15 to obtain a solution; mixing the solution with acetone in a weight ratio of 1:6 to obtain a second mixture containing a second solid precipitate; filtering the second solid precipitate out of the second mixture using a filter of 0.2 μm to obtain a filtrate; determining a weight value ($W_{LS}$) of a solid content in the filtrate; and obtaining the value (T) by dividing the weight value ($W_{LS}$) by the weight value ($W_s$).

According to the fifth aspect of this invention, there is provided a liquid crystal alignment film formed from the liquid crystal alignment agent of this invention.

According to the sixth aspect of this invention, there is provided a liquid crystal display element including the liquid crystal alignment film of this invention.

DETAILED DESCRIPTION OF THE PREFERRED EMBODIMENTS

The liquid crystal alignment agent of the present invention includes a treated polymer (A) and an organic solvent (B) for dissolving the treated polymer (A). The treated polymer (A) is made by a process including the steps of: subjecting a tetracarboxylic dianhydride compound and a diamine compound to conduct a polymerization reaction to obtain an untreated polymer; preparing a co-precipitating solvent for the untreated polymer which includes a major amount of a poor solvent and a minor amount of a good solvent, the poor solvent being selected from the group consisting of a ketone, an ether, and a combination thereof; and subjecting the untreated polymer to a treatment with the co-precipitating solvent such that at least a significant amount of a polymer fraction having a molecular weight not larger than 3,000 is removed from the untreated polymer to obtain the treated polymer.

Preferably, a polymer fraction having a molecular weight not larger than 7,000 is removed from the untreated polymer after the treatment with the co-precipitating solvent.

The liquid crystal alignment agent of the present invention has a value (T) ranging from 0 to 1.0%, which is determined by: mixing the liquid crystal alignment agent with methanol in a weight ratio of 1:6 to obtain a first mixture containing a first solid precipitate; filtering the first solid precipitate out of the first mixture using a filter of 0.2 μm; drying the first solid precipitate in an oven at a temperature of 60° C. for 12 hours to obtain a dried solid having a weight value ($W_s$); mixing the dried solid with N-methyl-2-pyrrolidone in a weight ratio of 1:15 to obtain a solution; mixing the solution with acetone in a weight ratio of 1:6 to obtain a second mixture containing a second solid precipitate; filtering the second solid precipitate out of the second mixture using a filter of 0.2 μm to obtain a filtrate; determining a weight value ($W_{LS}$) of a solid content in the filtrate; and obtaining the value (T) by dividing the weight value ($W_{LS}$) by the weight value ($W_s$).

Treated Polymer (A):

The treated polymer (A) includes polyamic acid (A-1), polyimide (A-2), polyimide series block copolymer (A-3), or combinations thereof. The polyimide series block copolymer (A-3) includes polyamic acid block copolymer (A-3-1), polyimide block copolymer (A-3-2), polyamic acid-polyimide block copolymer (A-3-3), or combinations thereof.

Tetracarboxylic Dianhydride Compound:

Tetracarboxylic dianhydride compounds suitable for the present invention include aliphatic tetracarboxylic dianhydride, alicyclic tetracarboxylic dianhydride, and aromatic tetracarboxylic dianhydride.

Examples of aliphatic tetracarboxylic dianhydride include ethanetetracarboxylic dianhydride, butanetetracarboxylic dianhydride, or the like.

Examples of alicyclic tetracarboxylic dianhydride include 1,2,3,4-cyclobutanetetracarboxylicdianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexanetetracarboxylic dianhydride, cis-3,7-dibutylcycloheptyl-1,5-diene-1,2,5,6-tetracarboxylicdianhydride, 2,3,5-tricarboxylcyclopentylacetic dianhydride, 2,3,4,5-tetrahydrofurantetracarboxylic dianhydride, 3,4-dicarboxy-1,2,3,4-tetrahydronaphthalene-1-succinic acid dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, bicyclo[2.2.2]-octa-7-ene-2,3,5,6-tetracarboxylic dianhydride, and compounds represented by formulas (I-1) and (I-2):

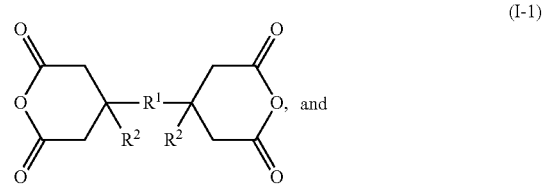

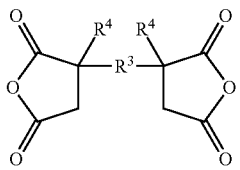

wherein, $R^1$ and $R^3$ are respectively a divalent organic group containing an aromatic ring, $R^2$ and $R^4$ are respectively a hydrogen or an alkyl group, with the proviso that a plurality of $R^2$'s and a plurality of $R^4$'s may be the same or different.

Examples of aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-biphenylethanetetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-diphenyltetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), and aromatic tetracarboxylic dianhydride compounds represented by the following formulas (1)-(4). These teracarboxylic dianhydride compounds may be used alone or in admixture of two or more.

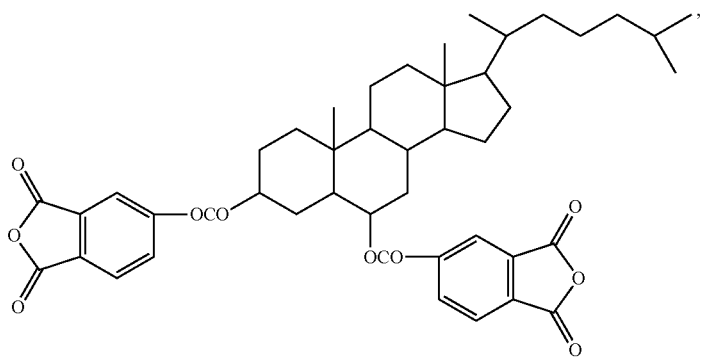

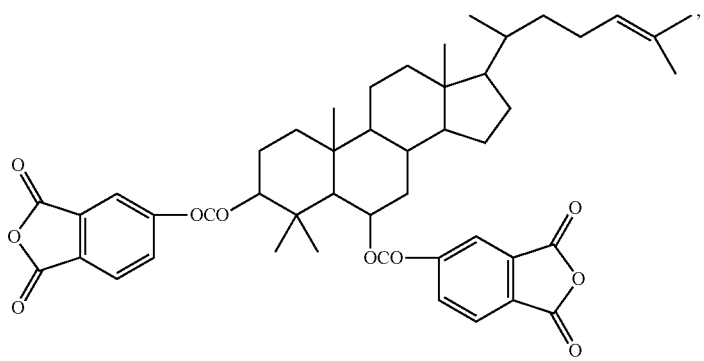

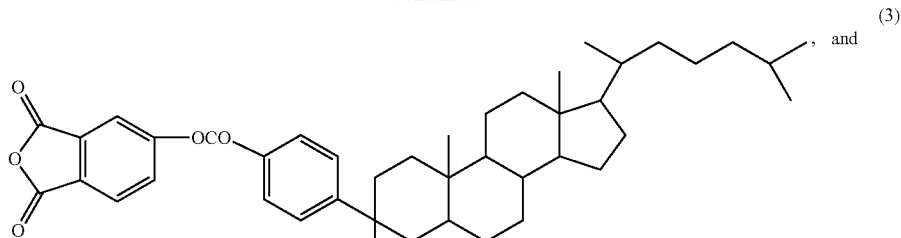

(3)

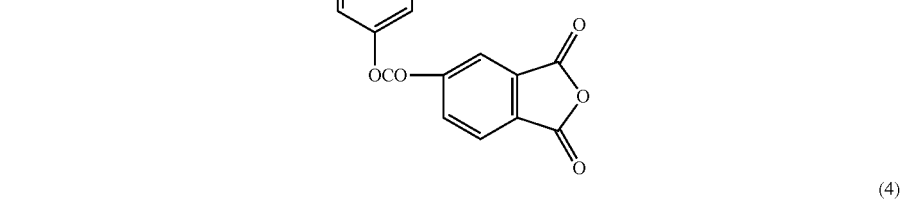

(4)

Among the aforementioned tetracarboxylic dianhydride compounds, 1,2,3,4-cyclobutanetetracarboxylic dianhydride, 1,2,3,4-cyclopentanetetracarboxylic dianhydride, 2,3,5-tricarboxycyclopentylacetic dianhydride, 3,4-dicarboxy-1,2,3,4-tetrahydronaphthalene-1-succinic acid dianhydride, the compounds represented by the following formulas (5)-(7) taken as examples from the compounds represented by the aforementioned formula (I-1), the compounds represented by the following formula (8) taken as an example from the compounds represented by the aforementioned formula (I-2), pyromellitic dianhydride, 3,3',4,4'-benzophenonetetracarboxylic dianhydride, and 3,3',4,4'-diphenylsulfonetetracarboxylic dianhydride are preferred as the tetracarboxylic dianhydride compound.

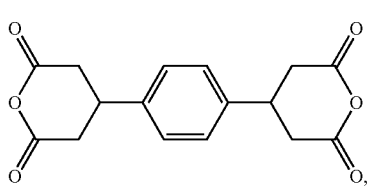

(5)

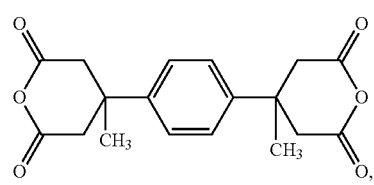

(6)

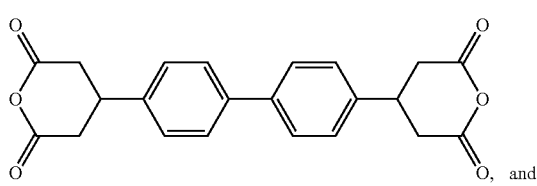

(7)

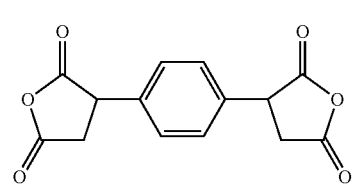

(8)

Diamine Compound:

The diamine compounds used in the present invention include aliphatic or alicyclic diamine compounds, aromatic diamine compounds, or other diamine compounds.

Examples of aliphatic or alicyclic diamine compounds include 1,3-diaminopropane, 1,4-diaminobutane, 1,5-diaminopentane, 1,6-diaminohexane, 1,7-diaminoheptane, 1,8-diaminooctane, 1,9-diaminononane, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclic[6.2.1.0$^{2,7}$]-undecylenedimethylenediamine, and 4,4'-methylenebis(cyclohexylamine).

Examples of aromatic diamine compounds include p-phenylenediamine, m-phenylenediamine, o-phenylenediamine, 4,4'-diaminodiphenylmethane, 4,4'-diaminodiphenylethane, 4,4'-diaminodiphenylsulfide, 4,4'-diaminodiphenylsulfone, 3,3'-dimethyl-4,4'-diaminobiphenyl, 4,4'-diaminobenzanilide, 4,4'-diaminodiphenylether, 1,5-diaminonaphthalene, 2,2'-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenylether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[(4-(4-aminophenoxy)phenyl)sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-diamino-2,2'-bis(trifluoromethyl)biphenyl, and 4,4'-bis[(4-amino-2-trifluoromethyl)phenoxy]octafluorobiphenyl.

Examples of other diamine compounds include 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 3,5-diamino-1,2,4-triazole, 6,9-diamino-2-ethyoxyacridine lactate, 3,8-diamino-6-phenylphenanthridine, 1,4-diaminopiperazine, 3,6-diaminoacridine, bis(4-aminophenyl)phenylamine, and the compounds represented by the following formulas (II-1) and (II-2) (i.e., diamines having two primary amino groups and a nitrogen atom other than the primary amino group in the molecule):

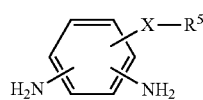
(II-1)

wherein, $R^5$ is a monovalent organic group having a ring structure containing a nitrogen atom and is selected from the group consisting of pyridine, pyrimidine, triazine, piperidine and piperazine; and X is a divalent organic group,

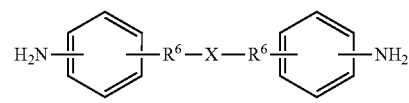
(II-2)

wherein, $R^6$ is a divalent organic group having a ring structure containing a nitrogen atom and is selected from the group consisting of pyridine, pyrimidine, triazine, piperidine and piperazine; and X is a divalent organic group; and with the proviso that a plurality of $R^6$'s may be the same or different, the compounds represented by the following formulas (II-3)~(II-5)

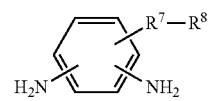
(II-3)

wherein, $R^7$ is a divalent organic group selected from the group consisting of —O—, —COO—, —OCO—, —NHCO—, —CONH— and —CO—; $R^8$ is a monovalent organic group having a group selected from the group consisting of a steroid skeleton, a trifluoromethyl group, a fluoro group, or an alkyl group having 6 to 30 carbon atoms,

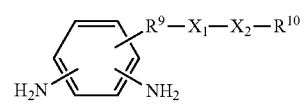
(II-4)

wherein, $R^9$ is a divalent organic group selected from the group consisting of —O—, —COO—, —OCO—, —NHCO—, —CONH— and —CO—; $X_1$ and $X_2$ are respectively selected from the group consisting of an alicyclic group, an aromatic group, and a heterocyclic group; $R^{10}$ is selected from the group consisting of an alkyl group having 3 to 18 carbon atoms, an alkoxy group having 3 to 18 carbon atoms, a fluoroalkyl group having 1 to 5 carbon atoms, a cyano group, and halogen atoms,

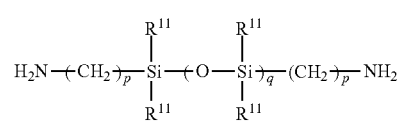
(II-5)

wherein, $R^{11}$ is a hydrocarbon group having 1 to 12 carbon atoms, with the proviso that a plurality of $R^{11}$'s may be the same or different, p is an integer from 1 to 3, and q is an integer from 1 to 20, and the compounds represented by the following formulas (9)-(15),

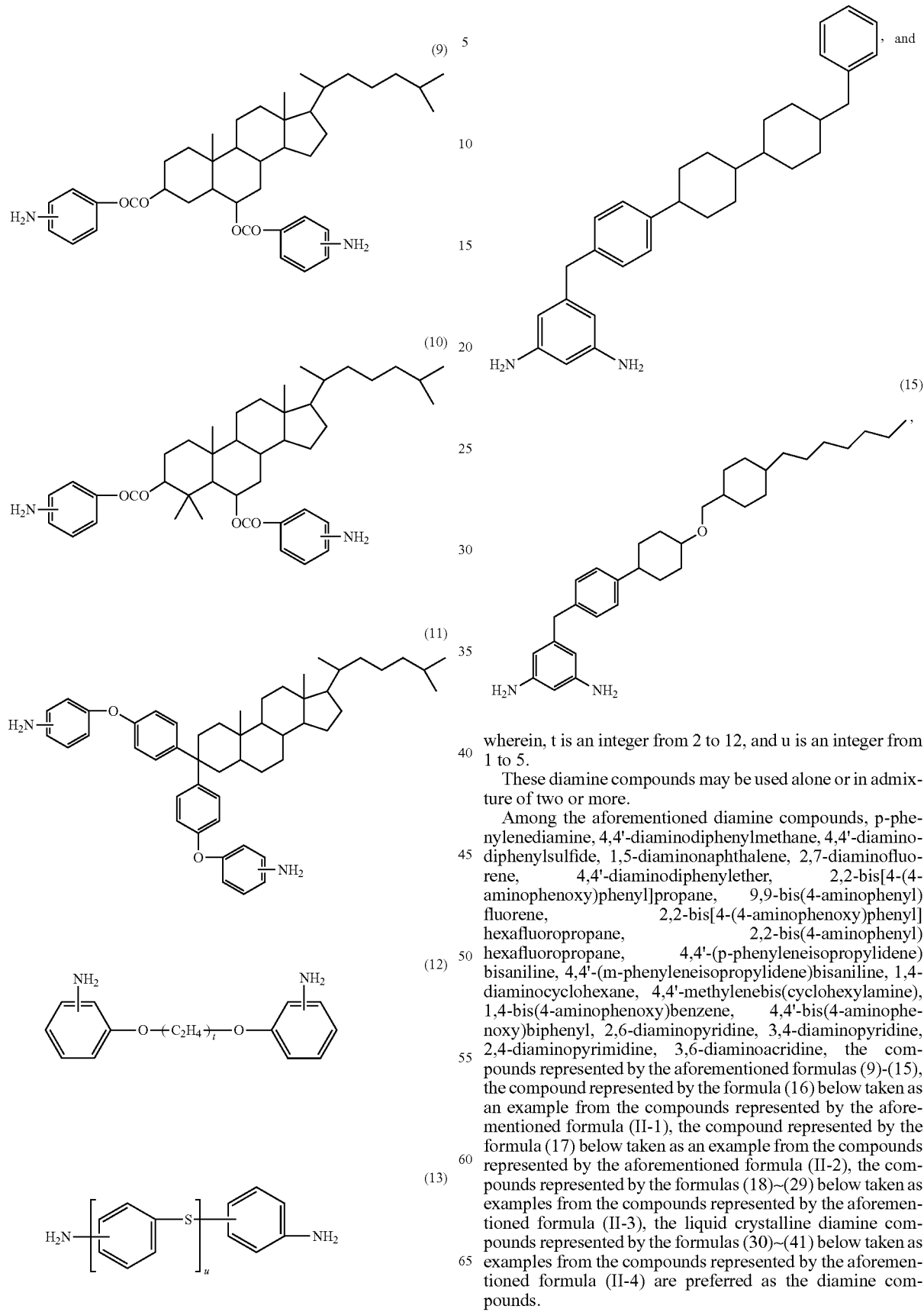

wherein, t is an integer from 2 to 12, and u is an integer from 1 to 5.

These diamine compounds may be used alone or in admixture of two or more.

Among the aforementioned diamine compounds, p-phenylenediamine, 4,4'-diaminodiphenylmethane, 4,4'-diaminodiphenylsulfide, 1,5-diaminonaphthalene, 2,7-diaminofluorene, 4,4'-diaminodiphenylether, 2,2-bis[4-(4-aminophenoxy)phenyl]propane, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenyleneisopropylidene)bisaniline, 4,4'-(m-phenyleneisopropylidene)bisaniline, 1,4-diaminocyclohexane, 4,4'-methylenebis(cyclohexylamine), 1,4-bis(4-aminophenoxy)benzene, 4,4'-bis(4-aminophenoxy)biphenyl, 2,6-diaminopyridine, 3,4-diaminopyridine, 2,4-diaminopyrimidine, 3,6-diaminoacridine, the compounds represented by the aforementioned formulas (9)-(15), the compound represented by the formula (16) below taken as an example from the compounds represented by the aforementioned formula (II-1), the compound represented by the formula (17) below taken as an example from the compounds represented by the aforementioned formula (II-2), the compounds represented by the formulas (18)~(29) below taken as examples from the compounds represented by the aforementioned formula (II-3), the liquid crystalline diamine compounds represented by the formulas (30)~(41) below taken as examples from the compounds represented by the aforementioned formula (II-4) are preferred as the diamine compounds.

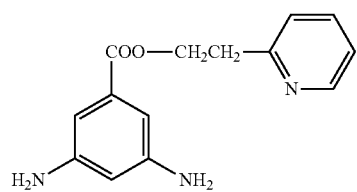 (16)
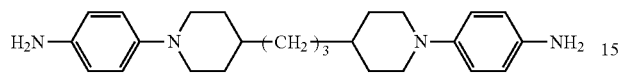 (17)
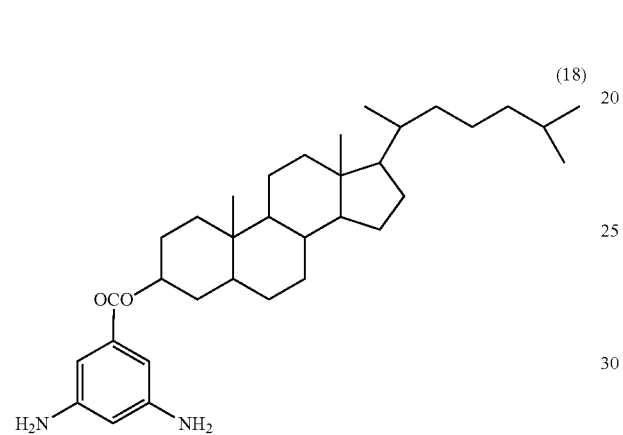 (18)
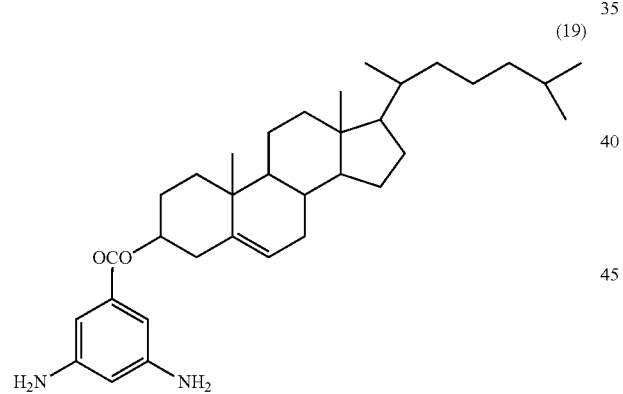 (19)
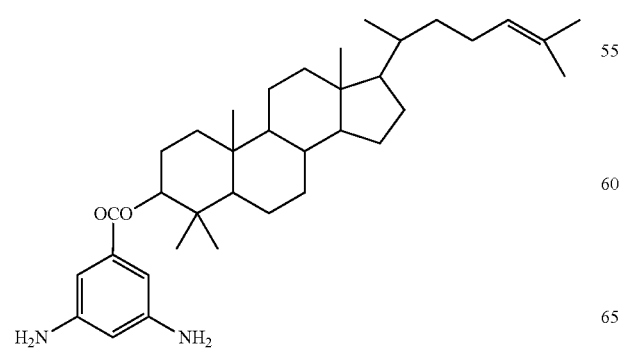 (20)
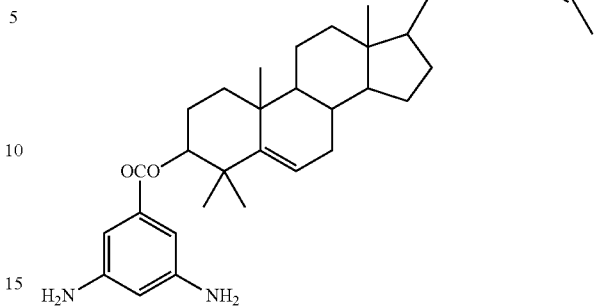 (21)
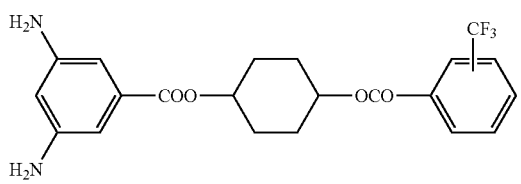 (22)
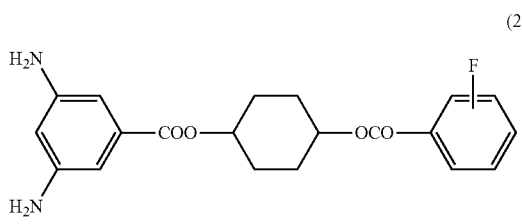 (23)
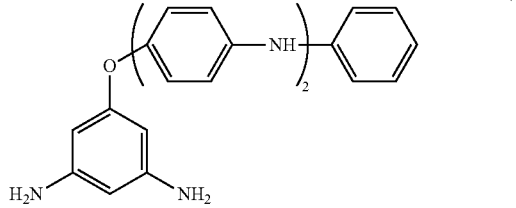 (24)
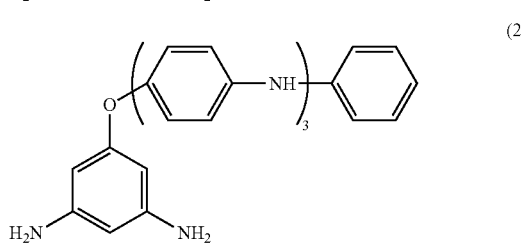 (25)
(26)

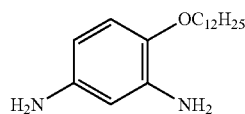
(27)

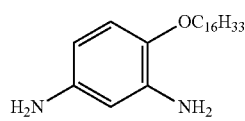
(28)

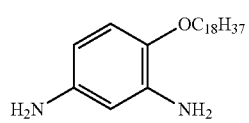
(29)

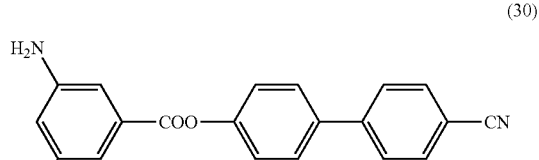
(30)

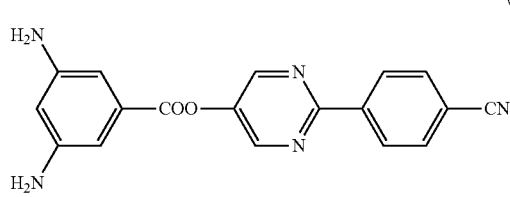
(31)

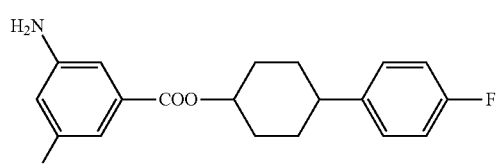
(32)

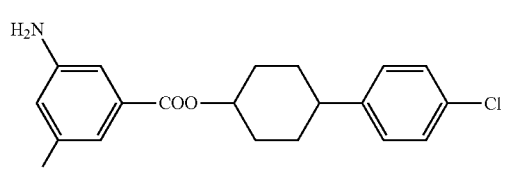
(33)

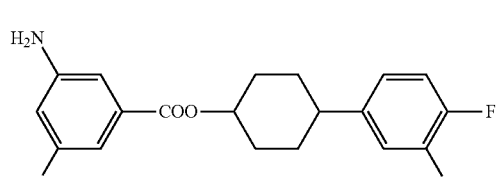
(34)

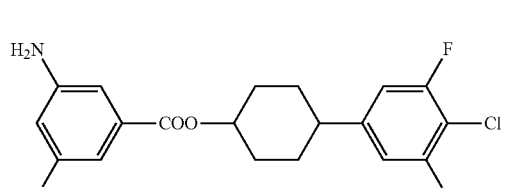
(35)

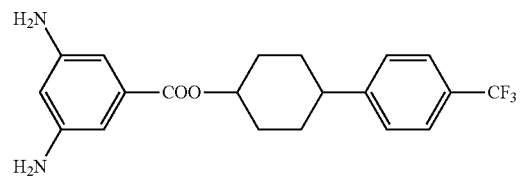
(36)

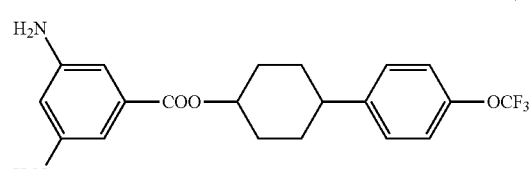
(37)

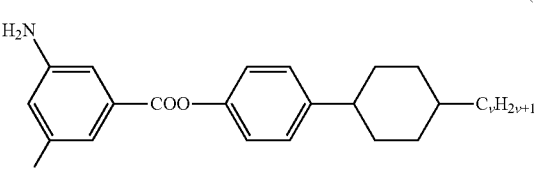
(38)

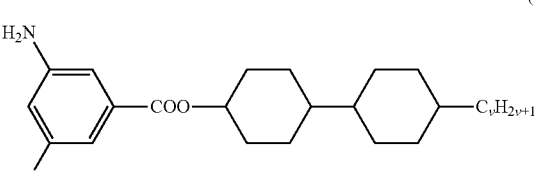
(39)

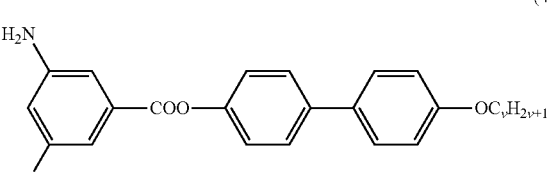
(40)

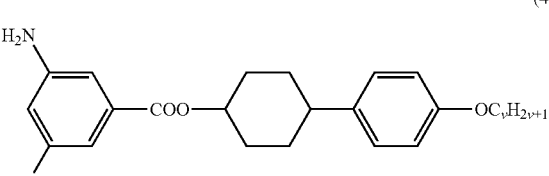
(41)

wherein, v is an integer from 3 to 12.

Synthesis of Polyamic Acid (A-1):

An untreated polyamic acid (A-1) is obtained from a polycondensation reaction between a tetracarboxylic dianhydride compound and a diamine compound, in which the equivalent ratio of the tetracarboxylic dianhydride compound to the diamine compound used for the polycondensation reaction ranges from 0.2 to 2, preferably from 0.3 to 1.2.

In the polycondensation reaction for the untreated polyamic acid (A-1), the temperature for the reaction of the tetracarboxylic dianhydride compound with the diamine compound in an organic solvent ranges generally from −20 to 150° C., and preferably from 0 to 100° C. There is no particular limitation to the organic solvent as long as the organic solvent is able to dissolve the reactants and the products. Examples of organic solvents include aprotic polar solvents, such as N-methyl-2-pyrrolidone, N,N-dimethylacetamide, N,N-dimethylformamide, dimethylsulfoxide, γ-butyrolactone, tetramethylurea, hexamethylphosphoric acid triamide, and the like; and phenolic solvents, such as meta-cresol, xylenol, phenol, halogenated phenols, and the like.

A co-precipitating solvent for the untreated polyamic acid (A-1) is prepared, which includes a major amount of a poor solvent and a minor amount of a good solvent.

The good solvent is a solvent having a good solubility for the polymer (A) (i.e., polyamic acid (A-1), polyimide (A-2), polyimide series block copolymer (A-3), or combinations thereof), and examples thereof are those for the aforesaid organic solvent.

The poor solvent is a solvent having a relatively poor solubility for the polymer (A), and examples of the poor solvent suitable for the present invention are a ketone (such as, acetone), an ether (such as, tetrahydrofuran), and a combination thereof.

Preferably, the poor solvent is in an amount of 800 to 900 parts by weight based on 1,000 parts by weight of the co-precipitating solvent.

The untreated polyamic acid (A-1) is poured into the co-precipitating solvent such that at least a significant amount of a polymer fraction having a molecular weight not larger than 3,000 is removed from the untreated polyamic acid (A-1) to obtain a precipitate, which is then dried under a reduced pressure to obtain the treated polyamic acid (A-1). Preferably, a polymer fraction having a molecular weight not larger than 7,000 is removed from the untreated polyamic acid (A-1) after the treatment with the co-precipitating solvent.

Synthesis of Polyimide (A-2):

Polyimide (A-2) in the present invention is obtained by further dehydration/ring-closure (imidization) processing of the polyamic acid (A-1).

The imidization processing of the polyamic acid polymer (A-1) is conducted by, for example, dissolving the polyamic acid (A-1) in an organic solvent, and heating in the presence of a dehydrating agent and imidization catalyst to implement a dehydration/ring-closing reaction. Heating temperature for the imidization processing is generally from 40 to 200° C., and preferably from 80 to 150° C.

If the reaction temperature of the imidization processing is lower than 40° C., then the dehydration ring-closing reaction cannot be fully implemented. If the reaction temperature exceeds 200° C., then the weight average molecular weight of the obtained polyimide (A-2) is reduced.

Examples of the dehydrating agent suitable for the imidization processing include an acid anhydride compound, such as acetic anhydride, propionic anhydride, trifluoroacetic anhydride, and the like. The used amount of the dehydrating agent is preferably from 0.01 to 20 moles per mole of the polyamic acid (A-1). Examples of the imidization catalyst suitable for the imidization processing include tertiary amines, such as pyridine, trimethylpyridine (collidine), dimethylpyridine (lutidine), triethylamine, and the like. The used amount of the imidization catalyst is preferably from 0.5 to 10 moles per mole of the dehydrating agent. The solvent used in the imidization processing is the same as the organic solvent useful for the aforementioned polycondensation reaction of the polyamic acid (A-1).

Synthesis of Polyimide Series Block Copolymer (A-3)

A polyimide series block copolymer (A-3) comprises polyamic acid block copolymer (A-3-1), polyimide block copolymer (A-3-2), polyamic acid-polyimide block copolymer (A-3-3), and combinations thereof.

In the synthesis reaction of the polyimide series block copolymer (A-3), the polyimide series block copolymer (A-3) is obtained by further polycondensation reaction of compounds selected from the polyamic acid (A-1), the polyimide (A-2), tetracarboxylic dianhydride compounds, and diamine compounds in an organic solvent. For example, the polyimide series block copolymer (A-3) can be obtained by a polycondensation reaction of first and second polyamic acids (A-1) which are different from each other in structures and terminal groups thereof; first and second polyimides (A-2) which are different from each other in structures and terminal groups thereof; a polyamic acid (A-1) and a polyimide (A-2) which are different from each other in structures and terminal groups thereof; a polyamic acid (A-1), a tetracarboxylic dianhydride, and a diamine, wherein at least one of the tetracarboxylic dianhydride and the diamine is structurally different from the one used in the polycondensation reaction for the polyamic acid (A-1); a polyimide (A-2), a tetracarboxylic dianhydride, and a diamine, wherein at least one of the tetracarboxylic dianhydride and the diamine is structurally different from the one used in the polycondensation reaction for the polyimide (A-2); a polyamic acid (A-1), a polyimide (A-2), a tetracarboxylic dianhydride, and a diamine, wherein at least one of the tetracarboxylic dianhydride and the diamine is structurally different from the ones used in the polycondensation reaction for the polyamic acid (A-1) and the polycondensation reaction for the polyimide (A-2); first and second polyamic acids (A-1), a tetracarboxylic dianhydride, and a diamine, wherein the first and second polyamic acids (A-1) are structurally different from each other; first and second polyimides (A-2), a tetracarboxylic dianhydride, and a diamine, wherein the first and second polyimides (A-1) are structurally different from each other; first and second polyamic acids (A-1) and a diamine, wherein the first and second polyamic acids (A-1) have anhydride terminal groups and are structurally different from each other; first and second polyamic acids (A-1) and a tetracarboxylic dianhydride, wherein the first and second polyamic acids (A-1) have amino terminal groups and are structurally different from each other; first and second polyimides (A-2) and a diamine, wherein the first and second polyimides (A-2) have anhydride terminal groups and are structurally different from each other; and first and second polyimides (A-2) and a tetracarboxylic dianhydride, wherein the first and second polyimides (A-2) have amino terminal groups and are structurally different from each other.

In the polycondensation reaction for the polyimide series block copolymer (A-3), the reaction temperature is generally from 0 to 200° C., preferably from 0 to 100° C., and examples of the solvent used for the polycondensation reaction are the same as those mentioned in the aforesaid polycondensation reaction for the polyamic acid (A-1).

Terminal-Modified Polymer:

The polyamic acid (A-1), the polyimide (A-2), and the polyimide series block copolymer (A-3) used in the present invention can also be the polymers which are terminal-modified after an adjustment of molecular weight thereof. The terminal-modified polymers can be used to improve the properties of coating property and the like of the liquid crystal alignment agent as long as they will not reduce the effects of the present invention. The process for synthesizing the terminal-modified polymers involves adding monofunctional compounds such as monoanhydride compounds, monoamine compounds, monoisocyanate compounds, or the like to the reaction system during the synthesis reaction for the polyamic acid. Examples of the monoanhydride compounds include maleic anhydride, phthalic anhydride, itaconic anhydride, n-decyl succinic anhydride, n-dodecyl succinic anhydride, n-tetradecyl succinic anhydride, n-hexadecyl succinic anhydride, and the like. Examples of monoamine compounds include aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-cetylamine, and the like. Examples of monoisocyanate compounds include phenyl isocyanate, naphthyl isocyanate, and the like.

Organic Solvents (B):

Examples of the organic solvents (B) used in the liquid crystal alignment agent of the present invention include N-methyl-2-pyrrolidone, γ-butyrolactone, γ-butyrolactam, N,N-dimethylformamide, N,N-dimethylethanamide, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, and the like.

Additives (C):

The additives such as functional silane containing compounds or epoxy group containing compounds may be added to the liquid crystal alignment agent of the present invention so as to improve adhesion of the liquid crystal alignment agent to the substrate to be applied as long as the intended properties of the liquid crystal alignment agent are not impaired.

Examples of the functional silane containing compounds include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, and the like.

Examples of the epoxy group containing compounds include ethylene glycol diglycidyl ether, polyethylene glycol diglycidyl ether, propylene glycol diglycidyl ether, tripropylene glycol diglycidyl ether, polypropylene glycol diglycidyl ether, neopentylglycol diglycidyl ether, 1,6-hexanediol diglycidyl ether, glycerin diglycidyl ether, 2,2-dibromo-neopentyl glycol diglycidyl ether, 1,3,5,6-tetragylcidyl-2,4-hexanediol, N,N,N',N'-tetragylcidyl-m-xylenediamine, 1,3-bis(N,N-digylcidylaminomethyl)cyclohexane, N,N,N',N'-tetragylcidyl-4,4'-diaminodiphenylmethane, 3-(N-allyl-N-glycidyl)aminopropyltrimethoxysilane, 3-(N,N-diglycidyl)aminopropyltrimethoxysilane, and the like.

Liquid Crystal Alignment Agent:

The liquid crystal alignment agent of the present invention is obtained by dissolving the treated polymer (A) and the optional additives (C) in the organic solvent (B).

The temperature for formulating the liquid crystal alignment agent of the present invention preferably ranges from 0 to 200° C., and more preferably from 20 to 60° C.

Concentration of the solid content in the liquid crystal alignment agent of the present invention is adjusted according to the properties such as viscosity, volatility, or the like, and ranges generally from 1 to 15 wt %, preferably from 2 to 15 wt %, more preferably from 3 to 15 wt %. When the liquid crystal alignment agent of the present invention is coated on a substrate surface to form a liquid crystal alignment film, the coating characteristics of the liquid crystal alignment agent may be better if the concentration of the solid content of the liquid crystal alignment agent falls within the range of from 1 to 15 wt %.

The liquid crystal alignment agent of the present invention has a value (T) ranging from 0 to 1.0%, preferably from 0.005% to 0.9%, more preferably from 0.01% to 0.8%. The value (T) is determined by: mixing the liquid crystal alignment agent with methanol in a weight ratio of 1:6 to obtain a first mixture containing a first solid precipitate; filtering the first solid precipitate out of the first mixture using a filter of 0.2 μm; drying the first solid precipitate in an oven at a temperature of 60° C. for 12 hours to obtain a dried solid having a weight value ($W_s$); mixing the dried solid with N-methyl-2-pyrrolidone in a weight ratio of 1:15 to obtain a solution; mixing the solution with acetone in a weight ratio of 1:6 to obtain a second mixture containing a second solid precipitate; filtering the second solid precipitate out of the second mixture using a filter of 0.2 μm to obtain a filtrate; determining a weight value ($W_{LS}$) of a solid content in the filtrate; and obtaining the value (T) by dividing the weight value ($W_{LS}$) by the weight value ($W_s$).

If the value (T) is greater than 1.0%, a liquid crystal alignment film made thereby may have the problem of longer image sticking erasing time.

Formation of a Liquid Crystal Alignment Film:

The liquid crystal alignment agent of the present invention is applied to one side of a substrate having a transparent conductive film by a roller coating method, a spinner coating method, a printing method, an ink-jet method, or the like, and is then heated to form a coating film.

Examples of the substrate suitable for the present invention include alkali-free glass, soda-lime glass, hard glass (Pyrex glass), quartz glass, and the like commonly used in liquid crystal display devices; or a transparent plastic substrate made of polyethylene terephthalate, polybutylene terephthalate, polyether sulphone, polycarbonate, or the like. The transparent conductive film formed on one side of the substrate may be a NESA® film (NESA® is the registered trademark of USA PPG Corporation) made of tin oxide ($SnO_2$), or an ITO (indium tin oxide) film made of indium oxide-tin oxide ($In_2O_3$—$SnO_2$), or the like.

Before the application of the liquid crystal alignment agent, in order to improve the adhesion of the coating film to the substrate and the transparent conductive film, a functional silane-containing compound or a functional titanium-containing compound may be applied to the surface of the substrate.

The heating process to form the liquid crystal alignment film comprises pre-bake and post-bake treatments after coating the liquid crystal alignment agent. The pre-bake treatment causes the organic solvent to volatilize and form a coating film. Temperature for the pre-bake treatment is generally from 30 to 120° C., preferably from 40 to 110° C., and more preferably from 50 to 100° C.

In addition, after the coating film is formed, the post-bake treatment is further carried out to conduct a dehydration/ring-closure (imidization) reaction so as to form an imidized coating film. Temperature for the post-bake treatment is generally from 150 to 300° C., preferably from 180 to 280° C., and more preferably from 200 and 250° C.

A film thickness of the formed coating film is preferably from 0.001 to 1 µm, and more preferably from 0.005 to 0.5 µm.

The formed coating film is rubbed in a certain direction with a roller wound with a cloth made of nylon, rayon, or cotton fiber according to the requirements. Accordingly, the alignability of the liquid crystal molecules is provided to the formed coating film to become a liquid crystal alignment film. Moreover, the methods for providing the alignability of the liquid crystal molecules by forming protrusions or patterns on at least one substrate are widely known as MVA (Multi-domain Vertical Alignment) or PVA (Patterned Vertical Alignment) methods.

Liquid Crystal Display Element:

Two substrates each having the aforementioned liquid crystal alignment film formed thereon are prepared and arranged to oppose each other with a space (cell gap). The peripheral portions of the two substrates are joined together with a sealing agent, liquid crystals are filled into the cell gap defined by the surfaces of the substrates and the sealing agent, and an injection hole is sealed up to form a liquid crystal cell. Then, a polarizer is affixed to the exterior sides of the liquid crystal cell (i.e., the other sides of the substrates forming the liquid crystal cell) to obtain the liquid crystal display element.

The sealing agent may be a general epoxy resin hardening agent, and spacer material may be glass beads, plastic beads, photosensitive epoxy resin, or the like. Examples of liquid crystals include nematic liquid crystals, for example, Schiff base liquid crystals, azoxy liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, cubane liquid crystals, or the like. Cholesterol liquid crystals, such as cholesteryl chloride, cholesteryl nonanoate, cholesteryl carbonate, or the like, and chiral agents sold under the trade names C-15, CB-15 (manufactured by Merck Company) may be added to the above liquid crystals. In addition, the polarizer affixed to the exterior sides of the liquid crystal cell may be, for example, a polarizer comprising cellulose acetate protective films sandwiching the polarizing film called "H film" which has absorbed iodine while a polyvinyl alcohol is stretched and aligned, or a polarizer composed of the H film itself.

EXAMPLES

The following examples are provided to illustrate the preferred embodiments of the invention, and should not be construed as limiting the scope of the invention.

The compound having the aforementioned formula (15) used in the following examples is made according to the method disclosed in JP 2003-96034, and is referred to as C7CDA in hereinafter. The compound having the aforementioned formula (14) used in the following examples is made according to the method disclosed in JP 2002-162630, and is referred to as BCDA in hereinafter.

Comparative Synthesis Example 1

A 500 ml four-necked conical flask equipped with a nitrogen inlet, a stirrer, a heater, a condenser and a thermometer was purged with nitrogen, and was added with C7CDA (0.74 g, 0.0015 mole), p-phenylenediamine (referred to as PDA hereinafter, 5.24 g, 0.0485 mole), and N-methyl-2-pyrrolidone (referred to as NMP hereinafter, 75 g). Stirring was conducted at room temperature until C7CDA and PDA was dissolved in NMP. Pyromellitic dianhydride (referred to as PMDA hereinafter, 10.91 g, 0.05 mole) and NMP (20 g) were then added, and reaction was conducted for 2 hours at room temperature. The reaction solution was then poured into water (1500 ml) to precipitate a polymer. The polymer obtained after filtering was dried in a vacuum oven at 60° C. to obtain a polyamic acid (A-1-a).

Comparative Synthesis Example 2

Polyamic acid (A-1-b) was obtained according to the method of Comparative Synthesis Example 1 except that a compound having the aforementioned formula (24) (referred to as VEDA hereinafter, 5.64 g, 0.01 mole) and 4,4'-diaminodiphenylmethane (referred to as DDM hereinafter, 7.93 g, 0.04 mole) were dissolved in NMP (100 g). 1,2,3,4-cyclobutanetetracarboxylic dianhydride (referred to as CBTA hereinafter, 9.81 g, 0.05 mole) and NMP (30 g) were then added.

Comparative Synthesis Example 3

A 500 ml four-necked conical flask equipped with a nitrogen inlet, a stirrer, a heater, a condenser and a thermometer was purged with nitrogen, and was added with BCDA (1.13 g, 0.0025 mole), PDA (5.14 g, 0.0475 mole), and NMP (45 g). Stirring was conducted at 60° C. until BCDA and PDA was dissolved in NMP. 3,4-dicarboxy-1,2,3,4-tetrahydronaphthalene-1-succinic acid dianhydride (referred to as TDA hereinafter, 15.01 g, 0.05 mole) and NMP (20 g) were then added, and reaction was conducted for 6 hours at room temperature. NMP (97 g), acetic anhydride (6 g), and pyridine (20 g) were added. Stirring was continued for a further 2 hours at 60° C. to conduct an imidization reaction. The reaction solution was then poured into water (1500 ml) to precipitate a polymer. The polymer obtained after filtering was dried in a vacuum oven at 60° C. to obtain a polyimide (A-2-a).

Comparative Synthesis Example 4

Polyimide (A-2-b) was obtained according to the method of Comparative Synthesis Example 3 except that VEDA (4.23 g, 0.0075 mole) and 4,4'-diaminodiphenylether (referred to as ODA, 8.51 g, 0.0425 mole) were dissolved in NMP (60 g). TDA (15.01 g, 0.05 mole) and NMP (25 g) were then added.

Comparative Synthesis Example 5

Polyamic acid (A-1-c) and polyamic acid (A-1-d) were obtained according to the method of Comparative Synthesis Example 3 except that when the polyamic acid (A-1-c) was prepared, VEDA (0.71 g, 0.00125 mole) and 2,2'-bis[4-(4-aminophenoxy)phenyl]propane (referred to as BAPP hereinafter, 20.01 g, 0.04875 mole) were dissolved NMP (160 g). 3,3',4,4'-benzophenonetetracarboxylic dianhydride (referred to as BTDA hereinafter, 15.95 g, 0.0495 mole) and NMP (50 g) were then added. When the polyamic acid (A-1-d) was prepared, C7CDA (0.61 g, 0.00125 mole) and DDM (9.67 g, 0.04875 mole) were dissolved in NMP (120 g). BTDA (16.27 g, 0.0505 mole) and NMP (30 g) were then added.

A 500 ml four-necked conical flask equipped with a nitrogen inlet, a stirrer, a heater, a condenser and a thermometer was purged with nitrogen, and was added with polyamic acid (A-1-c) (3 g) and NMP (17 g). Stirring was conducted at room temperature to dissolve polyamic acid (A-1-c) in NMP.

Polyamic acid (A-1-d) (3 g) and NMP (17 g) were added, and stirring was continued at 60° C. for 6 hours. The reaction solution was then poured into water (1500 ml) to precipitate a polymer. The polymer obtained after filtering was dried in a vacuum oven at 60° C. to obtain a polyamic acid block copolymer (A-3-1-a).

Comparative Synthesis Example 6

A 500 ml four-necked conical flask equipped with a nitrogen inlet, a stirrer, a heater, a condenser and a thermometer was purged with nitrogen, and was added with BCDA (0.57 g, 0.00125 mole), PDA (5.27 g, 0.04875 mole), and NMP (100 g). Stirring was conducted at room temperature to dissolve BCDA and PDA in NMP. BTDA (15.95 g, 0.0495 mole) and NMP (25 g) were further added, and stirring was continued at room temperature for 2 hours. NMP (94 g), acetic anhydride (15 g), and pyridine (12 g) were further added, and stirring was continued at 110° C. for 2 hours to conduct an imidization reaction. The reaction solution was then poured into water (1500 ml) to precipitate a polymer. The polymer obtained after filtering was dried in a vacuum oven at 60° C. to obtain a polyimide (A-2-c).

Polyimide (A-2-d) was obtained by repeating the method for obtaining polyimide (A-2-c) except that C7CDA (0.86 g, 0.00175 mole) and DDM (9.57 g, 0.04825 mole) were dissolved in NMP (120 g) and that BTDA (16.27 g, 0.0505 mole) and NMP (30 g) were then added.

A 500 ml four-necked conical flask equipped with a nitrogen inlet, a stirrer, a heater, a condenser and a thermometer was purged with nitrogen, and was added with polyimide (A-2-c) (3 g) and NMP (17 g). Stirring was conducted at room temperature to dissolve polyimide (A-2-c) in NMP. Polyimide (A-2-d) (3 g) and NMP (17 g) were further added, and stirring was continued at 60° C. for 6 hours. The reaction solution was then poured into water (1500 ml) to precipitate a polymer. The polymer obtained after filtering was dried in a vacuum oven at 60° C. to obtain a polyimide-polyimide block copolymer (A-3-2-a).

Comparative Synthesis Example 7

A 500 ml four-necked conical flask equipped with a nitrogen inlet, a stirrer, a heater, a condenser and a thermometer was purged with nitrogen, and was added with BCDA (2.26 g, 0.005 mole), PDA (5.27 g, 0.04875 mole), and NMP (100 g). Stirring was conducted at room temperature to dissolve BCDA and PDA in NMP. BTDA (15.95 g, 0.0495 mole) and NMP (35 g) were further added, and reaction was continued at room temperature for 2 hours. The reaction solution was then poured into water (1500 ml) to precipitate a polymer. The polymer obtained after filtering was dried in a vacuum oven at 60° C. to obtain a polyamic acid (A-1-e).

Additionally, a 500 ml four-necked conical flask equipped with a nitrogen inlet, a stirrer, a heater, a condenser and a thermometer was purged with nitrogen, and was added with BCDA (2.26 g, 0.005 mole), DDM (8.92 g, 0.045 mole), and NMP (100 g). Stirring was conducted at room temperature to dissolve BCDA and DDM in NMP. BTDA (16.27 g, 0.0505 mole) and NMP (55 g) were further added, and reaction was continued at room temperature for 2 hours. NMP (94 g), acetic anhydride (15 g), and pyridine (12 g) were further added, and stirring was continued at 110° C. for 2 hours to conduct an imidization reaction. The reaction solution was then poured into water (1500 ml) to precipitate a polymer. The polymer obtained after filtering was dried in a vacuum oven at 60° C. to obtain a polyimide (A-2-e).

A 500 ml four-necked conical flask equipped with a nitrogen inlet, a stirrer, a heater, a condenser and a thermometer was purged with nitrogen, and was added with polyimide (A-2-e) (3 g) and NMP (17 g). Stirring was conducted at room temperature to dissolve polyimide (A-2-e) in NMP. Polyamic acid (A-1-e) (3 g) and NMP (17 g) were further added, and reaction was continued at 60° C. for 6 hours. The reaction solution was then poured into water (1500 ml) to precipitate a polymer. The polymer obtained after filtering was dried in a vacuum oven at 60° C. to obtain a polyamic acid-polyimide block copolymer (A-3-3-a).

Synthesis Example 1

100 parts by weight of the polyamic acid (A-1-a) obtained from Comparative Synthesis Example 1 was added into a co-solvent system of 850 parts by weight of acetone and 150 parts by weight of NMP. Stirring was conducted for 30 minutes. The precipitate obtained after filtering was placed in a vacuum oven at 60° C. to devolatilize residual solvent so as to obtain a polyamic acid (A-1-a').

Synthesis Example 2

100 parts by weight of the polyamic acid (A-1-b) obtained from Comparative Synthesis Example 2 was added into a co-solvent system of 900 parts by weight of acetone and 100 parts by weight of NMP. Stirring was conducted for 30 minutes. The precipitate obtained after filtering was placed in a vacuum oven at 60° C. to devolatilize residual solvent. The aforesaid dissolving, precipitating, and devolatilizing processes were repeated once to obtain a polyamic acid (A-1-b').

Synthesis Example 3

100 parts by weight of the polyimide (A-2-a) obtained from Comparative Synthesis Example 3 was added into a co-solvent system of 800 parts by weight of acetone and 200 parts by weight of NMP. Stirring was conducted for 30 minutes. The precipitate obtained after filtering was placed in a vacuum oven at 60° C. to devolatilize residual solvent. The aforesaid dissolving, precipitating, and devolatilizing processes were repeated twice. The precipitate thus obtained was added into a co-solvent system of 950 parts by weight of acetone and 50 parts by weight of NMP, and stirring was continued for 30 minutes. The precipitate obtained after filtering was placed in a vacuum oven at 60° C. to devolatilize residual solvent. The aforesaid dissolving, precipitating, and devolatilizing processes were repeated twice to obtain a polyimide (A-2-a').

Synthesis Example 4

100 parts by weight of the polyimide (A-2-b) obtained from Comparative Synthesis Example 4 was added into a co-solvent system of 800 parts by weight of acetone and 200 parts by weight of NMP. Stirring was conducted for 30 minutes. The precipitate obtained after filtering was placed in a vacuum oven at 60° C. to devolatilize residual solvent. The aforesaid dissolving, precipitating, and devolatilizing processes were repeated three times. The precipitate thus obtained was added into a co-solvent system of 900 parts by weight of acetone and 100 parts by weight of NMP, and stirring was continued for 30 minutes. The precipitate obtained after filtering was placed in a vacuum oven at 60° C. to devolatilize residual solvent. The aforesaid dissolving, precipitating, and devolatilizing processes were repeated four times to obtain a polyimide (A-2-b').

Synthesis Example 5

100 parts by weight of the polyamic acid block copolymer (A-3-1-a) obtained from Comparative Synthesis Example 5 was added into a co-solvent system of 500 parts by weight of tetrahydrofuran, 400 parts by weight of acetone, and 100 parts by weight of NMP. Stirring was conducted for 30 minutes. The precipitate obtained after filtering was placed in a vacuum oven at 60° C. to devolatilize residual solvent. The aforesaid dissolving, precipitating, and devolatilizing processes were repeated twice to obtain a polyamic acid block copolymer (A-3-1-a').

Synthesis Example 6

100 parts by weight of the polyimide-polyimide block copolymer (A-3-2-a) obtained from Comparative Synthesis Example 6 was added into a co-solvent system of 700 parts by weight of tetrahydrofuran, 200 parts by weight of acetone, and 100 parts by weight of NMP. Stirring was conducted for 30 minutes. The precipitate obtained after filtering was placed in a vacuum oven at 60° C. to devolatilize residual solvent. The aforesaid dissolving, precipitating, and devolatilizing processes were repeated three times to obtain a polyimide-polyimide block copolymer (A-3-2-a').

Synthesis Example 7

100 parts by weight of the polyamic acid-polyimide block copolymer (A-3-3-a) obtained from Comparative Synthesis Example 7 was added into a co-solvent system of 600 parts by weight of tetrahydrofuran, 300 parts by weight of acetone, and 100 parts by weight of NMP. Stirring was conducted for 30 minutes. The precipitate obtained after filtering was placed in a vacuum oven at 60° C. to devolatilize residual solvent. The aforesaid dissolving, precipitating, and devolatilizing processes were repeated three times to obtain a polyamic acid-polyimide block copolymer (A-3-3-a').

[Preparation of Liquid Crystal Alignment Agent and Liquid Crystal Display Element]

In the following Examples and Comparative Examples, liquid crystal alignment agents and liquid crystal display elements were prepared and were evaluated according to the following evaluating methods.

[Evaluating Methods]

1. Analysis of Solid Content in a Filtrate:

A prepared liquid crystal alignment agent is mixed with methanol in a weight ratio of 1:6 to obtain a first mixture containing a first solid precipitate. The first solid precipitate is filtrated out of the first mixture using a filter of 0.2 μm (Critical Process Filtration, Inc., Model ETM, PTFE, 0.2 μm pore size) and is dried in an oven at a temperature of 60° C. for 12 hours to obtain a dried solid. The weight of the dried solid is determined and is represented by a value $W_S$.

The dried solid is mixed with NMP in a weight ratio of 1:15 to obtain a solution. The solution is mixed with acetone in a weight ratio of 1:6 to obtain a second mixture containing a second solid precipitate. The second solid precipitate is filtrated out of the second mixture using a filter of 0.2 μm (Critical Process Filtration, Inc., Model ETM, PTFE, 0.2 μm pore size) to obtain a filtrate. The weight of the filtrate is determined and is represented by a value $W_L$.

5 ml of the filtrate is placed on an aluminum plate, and is baked on a heater at 225° C. for 30 minutes. The weight ($W_0$) of the aluminum plate, the total weight ($W_1$) of the aluminum plate and the filtrate before baking, and the total weight ($W_2$) of the aluminum plate and the solid content residue after the baking are determined. The solid content in the filtrate is calculated according to the following formulas (E1) and (E2), and is represented by a value $W_{LS}$:

$$TS=[(W_2-W_0)/(W_1-W_0)]\times 100\% \tag{E1}$$

$$W_{LS}=W_L\times TS \tag{E2}$$

wherein TS is a percentage of the solid content in the filtrate.

The weight ratio (T) of the value $W_{LS}$ to the value $W_S$ is then calculated.

2. Pretilt Angle

The pretilt angle of a liquid crystal alignment film is measured by a crystal rotation method using an He—Ne laser light (manufactured by CHUO PRECISION INDUSTRIAL CO., LTD., Model OMS-CM4RD) according to the method described in T. J. Scheffer, et. al., J. Appl. Phys., vol. 19, 2013 (1980).

3. Image Sticking Erasing Time

After applying a rectangular wave of 30 Hz and 3.0 Volts produced by superimposing 3.0 volts of direct current and 6.0 volts (peak-to-peak) of alternating current to the manufactured liquid crystal cell at 70° C. for 20 hours, the voltage application is terminated and the period for erasing the image sticking phenomenon is determined.

○: The period for erasing the image sticking phenomenon is less than 20 sec.

Δ: The period for erasing the image sticking phenomenon is from 20 to 90 sec.

X: The period for erasing the image sticking phenomenon is greater than 90 sec.

Example 1

100 parts by weight of the polyamic acid (A-1-a') obtained from Synthesis Example 1 was dissolved in a co-solvent of 1250 parts by weight of NMP/250 parts by weight of ethylene glycol n-butyl ether (referred to as BC hereinafter) at room temperature to obtain an alignment agent solution.

The alignment agent solution was coated onto an ITO (indium-tin-oxide) glass substrate using a printing machine (manufactured by Japan Nissha Printing Co., Ltd., Model S15-036), after which the ITO glass substrate coated with the alignment agent solution was pre-baked on a heating plate at a temperature of 100° C. for five minutes, and was then post-baked in a hot air circulation baking oven at a temperature of 220° C. for 30 minutes to form a film on the ITO glass substrate. The thickness of the film was measured to be around 800±200 Å using a film thickness measuring device (manufactured by KLA-Tencor, Model Alpha-step 500).

An alignment (rubbing) process was carried out on the surface of the film using a rubbing machine (Model RM02-11 manufactured by Iinuma Gauge Mfg. Co., Ltd.). The stage moving rate was 50 mm/sec. When rubbing, a hair push-in length was 0.3 mm, and was unidirectionally rubbed once. Two glass substrates each coated with the liquid crystal alignment film were manufactured by the aforementioned steps. Thermo-compression adhesive agent was applied to one glass substrate, and spacers of 4 μm were sprayed on the other glass substrate. The two glass substrates were aligned and bonded together in a vertical direction, and then 10 kg of pressure was applied using a thermocompressor to carry out thermocompression at 150° C. Liquid crystal was poured using a liquid crystal pouring machine (manufactured by Shimadzu Corporation, Model ALIS-100X-CH), ultraviolet light was then used to harden a sealant to seal the liquid crystal injection hole, and an annealing treatment was conducted in an oven at 60° C. for 30 minutes, thereby manufacturing a liquid crystal cell and further manufacturing a liquid crystal display element.

The liquid crystal alignment agent and the liquid crystal display element obtained thereby were evaluated according to the aforesaid evaluating methods. The evaluating results are shown in Table 1.

Examples 2 to 10

Examples 2 to 10 were conducted in a manner identical to that of Example 1 using the polymers (A), organic solvents (B), and the additives (C) shown in Table 1. The liquid crystal alignment agents and the liquid crystal display elements obtained in Examples 2 to 10 were evaluated according to the evaluating methods, and results are shown in Table 1.

It should be noted that the alignment process was omitted in Examples 2 and 4.

Comparative Examples 1 to 8

Comparative Examples 1 to 8 were conducted in a manner identical to that of Example 1 using the polymers (A), organic solvents (B), and the additives (C) shown in Table 1. The liquid crystal alignment agents and the liquid crystal display elements obtained in Comparative Examples 1 to 8 were evaluated according to the evaluating methods, and results are shown in Table 1.

It should be noted that the alignment process was omitted in Comparative Examples 2 and 4.

As shown in Table 1, the period for erasing the image sticking phenomenon is greater than 90 seconds for Comparative Examples 1 to 7, and is from 20 to 90 seconds for Comparative Example 8. The period for erasing the image sticking phenomenon is less than 20 seconds for all of Examples 1 to 10. Therefore, it is demonstrated that the image sticking problem is improved significantly using the liquid crystal alignment agent of the present invention. Furthermore, it is also shown in Table 1 that the pretilt angle of the liquid crystal alignment film of the present invention does not differ much from that of the commonly used liquid crystal alignment film, and thus complies with the industrial standard.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for making a treated polymer for a liquid crystal alignment agent, comprising the steps of:
    subjecting a tetracarboxylic dianhydride compound and a diamine compound to conduct a polymerization reaction to obtain an untreated polymer;
    preparing a co-precipitating solvent for the untreated polymer which includes a poor solvent in an amount of 800 to 900 parts by weight based on 1,000 parts by weight of the co-precipitating solvent and a good solvent, wherein the poor solvent is selected from the group consisting of a ketone, an ether, and a combination thereof; and

TABLE 1

| | Components | Examples | | | | | | | | | | Comparative Examples | | | | | | | |
| --- | --- | --- | --- | --- | --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 1 | 2 | 3 | 4 | 5 | 6 | 7 | 8 |
| Polymer (A) (pbw) | A-1-a | | | | | | | | | | 40 | 100 | | | | | | | 60 |
| | A-1-a' | 100 | | | | | | | 80 | 70 | 60 | | | | | | | | 40 |
| | A-1-b | | | | | | | | | | | | 100 | | | | | | |
| | A-1-b' | | 100 | | | | | | | | | | | | | | | | |
| | A-2-a | | | | | | | | | 30 | | | | 100 | | | | | |
| | A-2-a' | | | 100 | | | | | 20 | | | | | | | | | | |
| | A-2-b | | | | | | | | | | | | | | 100 | | | | |
| | A-2-b' | | | | 100 | | | | | | | | | | | | | | |
| | A-3-1-a | | | | | | | | | | | | | | | 100 | | | |
| | A-3-1-a' | | | | | 100 | | | | | | | | | | | | | |
| | A-3-2-a | | | | | | | | | | | | | | | | 100 | | |
| | A-3-2-a' | | | | | | 100 | | | | | | | | | | | | |
| | A-3-3-a | | | | | | | | | | | | | | | | | 100 | |
| | A-3-3-a' | | | | | | | 100 | | | | | | | | | | | |
| Organic Solvent (B) (pbw) | B-1 | 1250 | 1250 | 1400 | 1400 | 1250 | 1250 | 1250 | 1250 | 1250 | 1250 | 1250 | 1250 | 1250 | 1250 | 1250 | 1250 | 1250 | 1250 |
| | B-2 | 250 | 250 | 100 | 100 | 250 | 250 | 250 | 250 | 250 | 250 | 250 | 250 | 250 | 250 | 250 | 250 | 250 | 250 |
| Additive (C) (pbw) | C-1 | | 5 | | | | | 2 | 10 | 15 | 10 | | 5 | | | | | 10 | 5 |
| | C-2 | | | 5 | | | | | | | | | 10 | | | | | | |
| T = $W_{LS}/W_S$ | | 0.36 | 0.09 | 0.01 | 0.005 | 0.42 | 0.26 | 0.31 | 0.21 | 0.80 | 1.00 | 1.82 | 1.62 | 1.35 | 1.46 | 2.32 | 2.21 | 2.13 | 1.11 |
| Result | Pretilt angle (°) | 5.4 | 89.3 | 3.0 | 88.4 | 2.4 | 5.6 | 10.2 | 4.9 | 4.7 | 5.4 | 5.3 | 89.2 | 3.1 | 88.6 | 2.3 | 5.7 | 9.8 | 5.3 |
| | Image sticking erasing time | ○ | ○ | ○ | ○ | ○ | ○ | ○ | ○ | ○ | ○ | X | X | X | X | X | X | X | Δ |

Note:
B-1: N-methyl-2-pyrrolidone;
B-2: ethylene glycol n-butyl ether
C-1: N,N,N',N'-tetraglycidyl-4,4'-diaminodiphenylmethane
C-2: N,N,N',N'-tetraglycidyl-m-xylenediamine subjecting the untreated polymer to a treatment with the co-precipitating solvent such that a polymer fraction having a molecular weight not larger than 3,000 is substantially removed from the untreated polymer to obtain the treated polymer.

2. The method as claimed in claim 1 further comprising substantially removing a polymer fraction having a molecular weight between 3,000 to 7,000 from the untreated polymer after the treatment with the co-precipitating solvent.

3. The method as claimed in claim 1, wherein the ketone includes acetone.

4. The method as claimed in claim 1, wherein the ether includes tetrahydrofuran.

5. A treated-polymer for a liquid crystal alignment agent made by a process comprising the steps of:
 subjecting a tetracarboxylic dianhydride compound and a diamine compound to conduct a polymerization reaction to obtain an untreated polymer;
 preparing a co-precipitating solvent for the untreated polymer which includes a poor solvent in an amount of 800 to 900 parts by weight based on 1,000 parts by weight of the co-precipitating solvent and a good solvent, wherein the poor solvent is selected from the group consisting of a ketone, an ether, and a combination thereof; and
 subjecting the untreated polymer to a treatment with the co-precipitating solvent such that a polymer fraction having a molecular weight not larger than 3,000 is substantially removed from the untreated polymer to obtain the treated polymer.

6. The treated-polymer as claimed in claim 5, wherein a polymer fraction having a molecular weight between 3,000 to 7,000 is substantially removed from the untreated polymer after the treatment with the co-precipitating solvent.

7. The treated polymer as claimed in claim 5, wherein the ketone includes acetone.

8. The treated polymer as claimed in claim 5, wherein the ether includes tetrahydrofuran.

9. A liquid crystal alignment agent, comprising:
 a treated polymer made by a process comprising the steps of: subjecting a tetracarboxylic dianhydride compound and a diamine compound to conduct a polymerization reaction to obtain an untreated polymer; preparing a co-precipitating solvent for the untreated polymer which includes a poor solvent a good solvent, wherein the poor solvent is selected from the group consisting of a ketone, an ether, and a combination thereof; and subjecting the untreated polymer to a treatment with the co-precipitating solvent such that a polymer fraction having a molecular weight not larger than 3,000 is substantially removed from the untreated polymer to obtain the treated polymer; and
 an organic solvent for dissolving the treated polymer.

10. The liquid crystal alignment agent as claimed in claim 9, wherein said treated polymer is selected from a group consisting of polyamic acid, polyimide, and polyimide series block copolymer.

11. The liquid crystal alignment agent as claimed in claim 10, wherein said polyimide series block copolymer is selected from a group consisting of polyamic acid block copolymer, polyimide block copolymer, and polyamic acid-polyimide block copolymer.

12. A liquid crystal alignment agent, comprising:
 a treated-polymer for a liquid crystal alignment agent made by a process comprising the steps of: subjecting a tetracarboxylic dianhydride compound and a diamine compound to conduct a polymerization reaction to obtain an untreated polymer; preparing a co-precipitating solvent for the untreated polymer which includes a poor solvent in an amount of 800 to 900 parts by weight based on 1,000 parts by weight of the co-precipitating solvent and a good solvent, wherein the poor solvent is selected from the group consisting of a ketone, an ether, and a combination thereof, and subjecting the untreated polymer to a treatment with the co-precipitating solvent such that a polymer fraction having a molecular weight not larger than 3,000 is substantially removed from the untreated polymer to obtain the treated polymer; and
 an organic solvent for dissolving the polymer,
 wherein the liquid crystal alignment agent has a value (T) ranging from 0 to 1.0%, which is determined by:
 mixing the liquid crystal alignment agent with methanol in a weight ratio of 1:6 to obtain a first mixture containing a first solid precipitate;
 filtering the first solid precipitate out of the first mixture using a filter of 0.2 μm;
 drying the first solid precipitate in an oven at a temperature of 60° C. for 12 hours to obtain a dried solid having a weight value ($W_s$);
 mixing the dried solid with N-methyl-2-pyrrolidone in a weight ratio of 1:15 to obtain a solution;
 mixing the solution with acetone in a weight ratio of 1:6 to obtain a second mixture containing a second solid precipitate;
 filtering the second solid precipitate out of the second mixture using a filter of 0.2 μm to obtain a filtrate;
 determining a weight value ($W_{LS}$) of a solid content in the filtrate; and
 obtaining the value (T) by dividing the weight value ($W_{LS}$) by the weight value ($W_s$).

13. The liquid crystal alignment agent as claimed in claim 12, wherein the value (T) ranges from 0.005% to 0.9%.

14. The liquid crystal alignment agent as claimed in claim 13, wherein the value (T) ranges from 0.01% to 0.8%.

15. The liquid crystal alignment agent as claimed in claim 12, wherein said polymer is selected from a group consisting of polyamic acid, polyimide, and polyimide series block copolymer.

16. The liquid crystal alignment agent as claimed in claim 15, wherein said polyimide series block copolymer is selected from a group consisting of polyamic acid block copolymer, polyimide block copolymer, and polyamic acid-polyimide block copolymer.

17. A liquid crystal alignment film made of the liquid crystal alignment agent as claimed in claim 12.

18. A liquid crystal display element, comprising the liquid crystal alignment film as claimed in claim 17.

* * * * *